(12) United States Patent
Enenkel

(10) Patent No.: US 12,038,532 B2
(45) Date of Patent: Jul. 16, 2024

(54) OPTICAL PROXIMITY SENSING CIRCUIT AND METHOD FOR OPTICAL PROXIMITY SENSING

(71) Applicant: ams AG, Premstaetten (AT)

(72) Inventor: Jan Enenkel, Premstaetten (AT)

( * ) Notice: Subject to any disclaimer, the term of this patent is extended or adjusted under 35 U.S.C. 154(b) by 618 days.

(21) Appl. No.: 16/622,521

(22) PCT Filed: Jul. 5, 2018

(86) PCT No.: PCT/EP2018/068197
§ 371 (c)(1),
(2) Date: Dec. 13, 2019

(87) PCT Pub. No.: WO2019/008081
PCT Pub. Date: Jan. 10, 2019

(65) Prior Publication Data
US 2020/0209357 A1 Jul. 2, 2020

(30) Foreign Application Priority Data

Jul. 6, 2017 (EP) ..................................... 17180032

(51) Int. Cl.
*G01S 7/481* (2006.01)
*G01S 7/4912* (2020.01)
*G01S 17/89* (2020.01)

(52) U.S. Cl.
CPC ........... *G01S 7/4811* (2013.01); *G01S 7/4912* (2013.01); *G01S 17/89* (2013.01)

(58) Field of Classification Search
None
See application file for complete search history.

(56) References Cited

U.S. PATENT DOCUMENTS

2006/0186363 A1* 8/2006 Hazelwood .............. H04N 5/33
250/580
2007/0024840 A1 2/2007 Fetzer et al.
(Continued)

FOREIGN PATENT DOCUMENTS

CN 203587801 U 5/2014
CN 105629213 A 6/2016
(Continued)

OTHER PUBLICATIONS

European Patent Office, International Search Report for PCT/EP2018/068197 dated Sep. 19, 2018.
(Continued)

*Primary Examiner* — Rebecca A Volentine
(74) *Attorney, Agent, or Firm* — MH2 TECHNOLOGY LAW GROUP LLP

(57) ABSTRACT

In one embodiment an optical proximity sensing circuit comprises an optical emitting device which is prepared to send a signal having a wavelength of the invisible spectrum, a light conversion material being prepared to convert a reflected signal into a detectable signal, the reflected signal being a function of a reflection of the signal off a human user and the detectable signal having a wavelength of the visible spectrum, and an optical receiving device arranged apart from but in a visual range of the optical emitting device and prepared to detect the detectable signal and therefrom provide a measurement signal which is a function of a distance between the optical proximity sensing circuit and the human user, wherein the conversion material is mounted to the optical receiving device, and wherein each of the signal, the reflected signal and the detectable signal is an optical signal.

15 Claims, 6 Drawing Sheets

(56) References Cited

U.S. PATENT DOCUMENTS

| | | | |
|---|---|---|---|
| 2008/0252618 A1 | 10/2008 | Chung et al. | |
| 2009/0002329 A1* | 1/2009 | Van Genechten | G06F 3/0421 345/173 |
| 2010/0102229 A1* | 4/2010 | Klinghult | H01L 27/14647 250/338.1 |
| 2012/0268701 A1* | 10/2012 | Nemoto | G06F 3/042 257/E33.044 |
| 2012/0280940 A1* | 11/2012 | Murai | G06F 3/0412 250/206.1 |
| 2013/0050677 A1* | 2/2013 | Kwong | G01J 1/0271 356/614 |
| 2017/0153475 A1* | 6/2017 | Li | G02F 1/1368 |
| 2019/0277703 A1* | 9/2019 | Valouch | G01J 5/59 |
| 2019/0363792 A1* | 11/2019 | Tsonev | G09G 5/10 |

FOREIGN PATENT DOCUMENTS

| | | |
|---|---|---|
| CN | 106063130 A | 10/2016 |
| TW | 201533459 A | 9/2015 |
| TW | 201638605 A | 11/2016 |

OTHER PUBLICATIONS

Taiwanese Examination Report (with English Translation) in corresponding Taiwanese Application No. 107120734 mailed on Dec. 7, 2021, 15 pages.

Chinese Office Action dated Feb. 6, 2023, CN Application No. 201880044155.1, 20 pages (including English translation).

\* cited by examiner

OPTICAL PROXIMITY SENSING CIRCUIT AND METHOD FOR OPTICAL PROXIMITY SENSING

BACKGROUND

The disclosure is related to an optical proximity sensing circuit and a method for optical proximity sensing.

The field of this disclosure concerns proximity sensing, especially optical proximity sensing, i.e. the detection of an approach of a human user to a sensing circuit or the determination of a distance between a user and a sensing circuit by employing optical means.

Proximity sensors are used in various handheld devices, e.g. mobile telephones, smartphones and the like, for detection of an approach of a user to such device in order to enhance user interface functionality of the device. Smartphones have become trendy accessories, status symbols and expressions of their user's lifestyle. Manufacturers spend a lot of effort on the design of a mobile phone. The target is to deliver devices which are light, slim, trendy and have an as seamless as possible optical appearance. Mobile phone makers strive towards devices which have less optical disturbances in their bezel design. These disturbance factors are, for example, the openings of ambient light sensors and/or optical proximity sensors.

State of the art optical proximity sensors use infrared radiation, e.g. light with a wavelength of 850 nm or 950 nm, because the human eye cannot see this radiation, but photodiodes employed in known sensors are sensitive in the range from 300 nm to 1100 nm and can consequently detect said radiation.

One known attempt to overcome the problem of the opening needed for an optical proximity sensor consists in applying more ink on top of the apertures of transmitter and receiver of the sensor. However, as a result, the performance of the sensor is decreased, unwanted crosstalk increases, and the detection distance is reduced.

Other implementations rely on only one opening, again resulting in even higher crosstalk.

The definitions as described above also apply to the following description unless stated otherwise.

SUMMARY

In one embodiment an optical proximity sensing circuit comprises an optical emitting device which is prepared to send a signal having a wavelength in the invisible spectrum, a light conversion material being prepared to convert a reflected signal into a detectable signal and an optical receiving device which is arranged apart from but in a visual range of the optical emitting device and is prepared to detect the detectable signal and therefrom provide a measurement signal. The reflected signal is a function of a reflection of the signal off a human user. The detectable signal has a wavelength in the visible range. The measurement signal is a function of a distance between the optical proximity sensing circuit and the human user. The conversion material is mounted to the optical receiving device. Each of the signal, the reflected signal and the detectable signal is an optical signal.

The emitting device sends the signal in the form of electromagnetic radiation with a longer wavelength than that of visible light. Therefore, the signal is invisible to the human user. The signal is reflected off the human user towards the optical proximity sensing circuit in the form of the reflected signal. The light conversion material converts the reflected signal into the detectable signal. The detectable signal is detected by the optical receiving device which therefrom provides the measurement signal.

Due to the use of the emitting device which sends a signal with a higher wavelength than in state of the art implementations and the subsequent conversion of the reflected signal into the detectable signal with a shorter wavelength, the proposed optical proximity sensing circuit enables detection of a proximity or approximation of a user to or towards a device without an opening which is needed in state of the art applications. In other words, a device like a smartphone can be provided with proximity sensing functionality without the need for an opening at the surface of this device specifically for the proximity sensing functionality by employing the proposed optical proximity sensing circuit.

The term "optical" is related to electromagnetic radiation which can be described by geometrical or ray optics and physical or wave optics. This involves ultraviolet radiation, UV, visible light, or infrared radiation, IR radiation, for example. The term "light" refers to electromagnetic radiation in general and to visible light, UV, and/or IR, in particular. The visible spectrum refers to light with a wavelength approximately between 400 nm and 700 nm. The invisible spectrum refers to light with a wavelength approximately between 700 nm and 10000 nm. In the present disclosure wavelengths between 1000 nm and 2000 nm of the invisible spectrum are especially relevant.

The approximation or proximity is detected by measuring the distance between the optical proximity sensing circuit and a user by way of the measurement signal.

The optical receiving device is arranged as far away as possible from the optical emitting device in order to reduce crosstalk resulting from direct receiving of the signal in the optical receiving device. At the same time the optical receiving device is arranged such that it is enabled to detect the reflected signal, it is therefore arranged in the visual range of the emitting device.

In a development the light conversion material comprises a stimulated anti-Stokes Raman scattering, SRS, material.

Several up-conversion materials are available, for example to provide a conversion from 1200 nm to 630 nm or from 1500 nm to 980 nm. SRS materials which generate one photon of a shorter wavelength using two photons of a similar and longer wavelength are desirable. Also, materials with higher quantum yield may be employed.

In a further development the optical emitting device comprises at least one light-emitting diode, LED, which is prepared to emit light with a wavelength of approximately 1200 nm as the signal. Alternatively, the optical emitting device comprises a vertical cavity surface-emitting laser which is prepared to emit light with a wavelength of approximately 1500 nm as the signal.

Consequently, the emitted signal has a wavelength in the higher infrared range which is invisible to a human user but is able to pass through a surface of the optical proximity sensing circuit, as well as the device, for instance a smartphone, in which it is implemented without the need for an aperture in such surface.

In an embodiment the optical receiving device comprises at least one photodiode which is sensitive for light in the range of 300 nm to 1100 nm.

Because of the up-conversion of the reflected signal into the detectable signal, a photodiode as known by those skilled in the art can be employed in the optical proximity sensing circuit.

In a development the photodiode is realized as a silicon photodiode which is doped with an up-conversion material either on its front side or on its backside. The up-conversion material in this development represents the conversion material.

In another embodiment the optical proximity sensing circuit further comprises an optical barrier which is mounted between the optical emitting device and the optical receiving device.

In order to further reduce crosstalk between emitting device and receiving device an optical barrier is arranged between the emitting and the receiving device. The optical barrier prevents the signal sent by the emitting device from directly reaching the light conversion material and/or the receiving device.

In a further development the optical proximity sensing circuit further comprises a first filter mounted between the conversion material and the optical receiving device. The first filter is prepared to transmit light with a wavelength of about 950 nm. Additionally or alternatively, the optical proximity sensing circuit comprises a second filter mounted to the conversion material such that the reflected signal passes the second filter before reaching the conversion material. The second filter is prepared to transmit light with a wavelength in the range of 1400 nm to 1500 nm.

The first filter is for instance a band pass filter which improves a signal-to-noise ration of the signal chain by removing unwanted wavelengths which do not contain any signal information. The second filter works on the reflected signal. It applies a band pass filtering to optimize the reflected signal before the conversion. The second filter can be implemented as an interference filter.

First and second filter provide an enhancement of the signal-to-noise ratio of the reflected or the detectable signal, respectively. First and second filter are respectively implemented as optical filter.

In another development the optical proximity sensing circuit further comprises a first optical lens which is mounted to the optical emitting device. The first optical lens represents a light beam shaping means for the signal. Additionally or alternatively the optical proximity sensing circuit further comprises a second optical lens which is mounted to the conversion material. The second optical lens represents a light beam shaping means for the reflected signal.

First and second optical lenses respectively realize an improvement of the focus of the optical emitting device towards the optical receiving device and vice versa. The signal-to-noise ratio which can be achieved in the detectable signal and subsequently in the measurement signal can be improved.

First and second filters and first and second lenses can be combined in different ways in order to further enhance the signal-to-noise ratio of the measurement signal.

In an embodiment the optical conversion material is semi-transparent. The optical receiving device is arranged in relation to the optical conversion material such that the reflected signal passes through the optical conversion material to hit the optical receiving device. In this embodiment the optical proximity sensing circuit further comprises a blocking layer which covers a surface of the optical receiving device and a surface of the optical emitting device. The blocking layer is prepared to prevent the detectable signal from leaving the optical proximity sensing circuit.

In this embodiment the optical path starts from the optical emitting device, for instance an LED emitting the signal with a wavelength of approximately 1200 nm, passes through the blocking layer, gets reflected off, for example, the skin of a human user, passes through the blocking layer and the conversion material and then reaches the optical receiving device. The blocking layer prevents the detectable signal from leaving the optical proximity sensing circuit, such that the human user will not see these light impulses. The blocking layer may be realized by a material which is transmissive for the signal and the reflected signal, i.e. transmissive at approximately 1200 nm. One example for such a material is black ink. Said material blocks any kind of back reflection of the detectable signal. The optical conversion material is in pass-through mode, i.e. it is semi-transparent.

In an alternative the optical conversion material is reflective. The optical receiving device is arranged in relation to the conversion material such that the reflected signal passes through the optical receiving device to hit the conversion material.

In this embodiment the optical path again starts out from the optical emitting device, for example an LED emitting a wavelength of about 1500 nm, gets reflected off the user and goes back through the optical receiving device, gets reflected and up-converted by way of the optical conversion material and is then detected in the optical receiving device, for instance a silicon photodiode. With respect to the previously described embodiment, the optical receiving device is flipped or turned around. As the material of the optical receiving device, for instance silicon, is transparent for the long wavelength of the reflected signal, the reflected signal shines through the photodiode of the optical receiving device.

Advantageously, this implementation allows using a conversion material with higher density of the up-converting nanocrystal structures which improves the optical efficiency of the conversion material. The optical receiving device may also be realized by a silicon die with a backside illuminated photodiode. Due to the orientation of the optical receiving device, the optical receiving device itself blocks visible light from being emitted towards the user of the device. Therefore, there is no need for a blocking layer in this embodiment.

In one embodiment a handheld device has a bezel which is prepared to form an outer surface of the device, the bezel facing a human user. The device further has the optical proximity sensing circuit according to one of the embodiments or developments described above. The bezel has a coating which is transparent to the signal. The optical proximity sensing circuit is arranged beneath the coating of the bezel.

The handheld device can be implemented in the form of, for example, a smartphone or mobile phone or a personal digital assistant or the like. The outer surface of the device is represented by the bezel, i.e. a glass panel made of sapphire glass or gorilla glass as known by those skilled in the art. The side of the bezel which does not face the user is covered by the coating layer which is realized for instance by ink or paint which is transparent in the range of 800 to 1500 nm, i.e. the near infrared, NIR, range.

Due to the realization of the optical proximity sensing circuit as described above, the bezel does not need an opening for the optical proximity sensing function.

In a development the handheld device further comprises a display which is mounted between the bezel and the optical proximity sensing circuit. The display comprises a liquid crystal display, LCD, or an active matrix organic light-emitting diode, AMOLED, display. The display has a backside which is transparent to the signal. The optical proximity sensing circuit is arranged beneath the backside of the display. The coating layer of the bezel in this development comprises an opening for receiving the display.

In this embodiment the optical proximity sensing circuit is implemented behind the display of the device. There is no need for an opening in the bezel of the device because of the usage of higher wavelengths for the signal emitted by the optical emitting device and the subsequent conversion of the reflected signal into the detectable signal. The display is transparent for these higher wavelengths.

In a development the handheld device further comprises a post-processing component having an integrator circuit and an inverter circuit which can be selectively coupled to an input of the inverter circuit, the post-processing component being prepared to receive the measurement signal and to provide a measurement result as a function of an integration of the measurement signal.

In one embodiment a method for optical proximity sensing has the following steps:
generating and sending a signal having a wavelength of the invisible spectrum,
receiving a reflected signal which is a function of a reflection of the signal off a human user,
converting the reflected signal and therefrom providing a detectable signal of the visible spectrum,
receiving the detectable signal and therefrom providing a measurement signal which is a function of a distance between an optical proximity sensing circuit and the human user.

Therein each of the signal, the reflected signal and the detectable signal is an optical signal.

By employing the signal with a higher wavelength, i.e. a wavelength of the invisible spectrum, and converting the reflected signal into the detectable signal, the method enables optical proximity sensing without the need for an opening.

The method may be implemented by the optical proximity sensing circuit as described above.

In a development converting the reflected signal is realized by up-converting a wavelength of the reflected signal from a wavelength invisible to the human user into to wavelength visible to the human user as the wavelength of a detectable signal.

The converting is realized for instance by the conversion material as already described above.

In a further development the method comprises shaping the signal and/or the reflected signal and/or filtering the reflected signal.

As described previously, the signal and/or the reflected signal can be shaped or formed by way of, for example, optical lenses. Additionally or alternatively, the reflected signal may be filtered by different optical filters.

BRIEF DESCRIPTION OF THE DRAWINGS

The text below explains the proposed optical proximity sensing circuit and corresponding method in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

DETAILED DESCRIPTION

Figure 1:
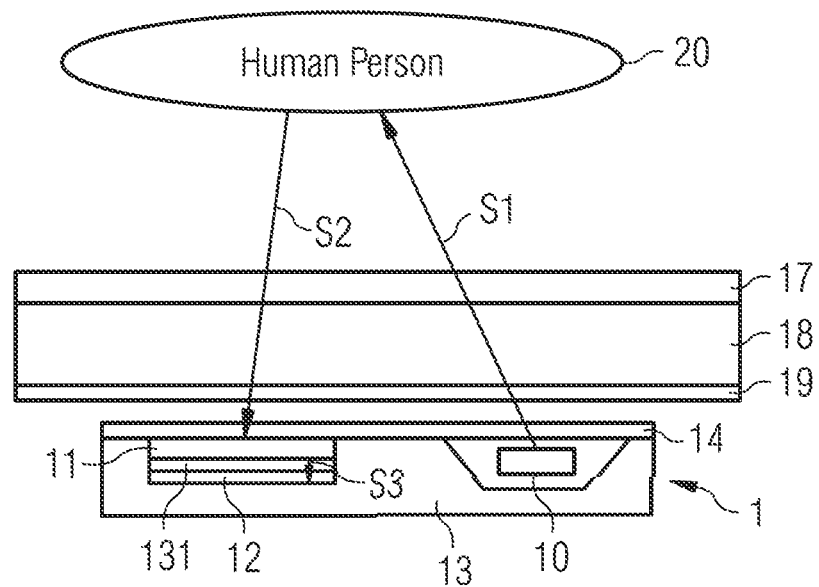
FIG. 1 shows a first embodiment example of the proposed handheld device with the proposed optical proximity sensing circuit.

FIG. 1 shows a first embodiment example of the proposed handheld device with the proposed optical proximity sensing circuit.

The device has the optical proximity sensing circuit 1, a bezel 17 and a display 18 with a display backside 19. A user of the device is depicted as human user 20.

The optical proximity sensing circuit 1 comprises an optical emitting device 10 which is prepared to send a signal S1, a light conversion material 11 which is prepared to convert a reflected signal S2 into a detectable signal S3, and an optical receiving device 12 which is arranged apart from, but in a visual range of, the optical emitting device 10. The light conversion material 11 is mounted to the optical receiving device 12. The signal S1, the reflected signal S2 and the detectable signal S3 are optical signals. The signal S1 has a wavelength which is invisible to the human user 20. The reflected signal S2 is a function of a reflection of the signal S1 off the human user 20. The detectable signal S3 has a wavelength which is visible to the human user 20.

The bezel 17 forms an outer surface of the device and faces the human user 20. Seen from the user's 20 viewpoint, the display 18 is mounted beneath the bezel 17 but on top of the optical proximity sensing circuit 1. The display 18 comprises an LDC or an AMOLED display. The backside 19 of the display 18 is transparent to the signal S1 and to the reflected signal S2.

In this embodiment the optical proximity sensing circuit 1 further has a blocking layer 14 covering the surface of the optical receiving device 12 and the surface of the optical emitting device 10, thereby basically covering a surface of the optical proximity sensing circuit 1. The optical proximity sensing circuit 1 according to the depicted embodiment further comprises a first filter 131 which is mounted between the conversion material 11 and the optical receiving device 12. The first filter 131 is prepared to transmit light with a wavelength of about 950 nm.

For detecting an approach of the human user 20 or for measuring the distance of the human user 20 to the device, the optical emitting device 10 emits the signal S1 having a wavelength invisible to the human user 20. For this purpose, the optical emitting device 10 comprises an LED emitting the signal S1 with a wavelength of about 1200 nm. As the blocking layer 14 is transmissive for light at wavelengths of 1200 nm and only blocks visible light, the signal S1 passes the blocking layer 14. Next, the signal S1 passes the display backside 19, the display 18 and the bezel 17 and is subsequently reflected off the skin of the human user 20. The reflected signal S2 having a wavelength coinciding with the wavelength of the signal S1 passes through the bezel 17, the display 18, the display backside 19 and enters the optical proximity sensing circuit 1 via the blocking layer 14. The reflected signal S2 is subsequently converted by the light conversion material 11 into the detectable signal S3. The light conversion material 11 therefore performs an up-conversion so that a wavelength of the detectable signal S3 is in the range visible to the human user 20. A wavelength of the detectable signal S3 is for example in the range of 630 nm. The detectable signal S3 then gets filtered in the first filter 131 which is realized, for example, as a red filter which removes components of sunlight in order to optimize the measurement signal. Finally, the detectable signal S3 reaches the optical receiving device 12 which therefrom provides a measurement signal representing a function of the distance between the optical proximity sensing circuit 1 and the human user 20. The blocking layer 14 prevents the detectable signal S3 from leaving the sensing circuit 1 and being noticed by the human user 20.

In the depicted embodiment the light conversion material 11 is employed in pass-through mode and therefore is semi-transparent. Alternatively, the optical emitting device 10 can be realized as a laser diode or vertical cavity surface-emitting laser.

The LCD, realized as a thin-film transistor, TFT, or the AMOLED display both show a high level of transmission at 1200 nm. Also an angular diffusion grade at this wavelength is low. Consequently, by using the signal S1 with the wavelength of approximately 1200 nm, for example, the proximity sensing circuit 1 can be placed and used behind the bezel 17 and the display 18. Consequently, no separate aperture has to be provided for proximity detection on the device's surface. Due to the higher wavelength an activation of AMOLED pixels is prevented.

In a development the activation of the optical proximity sensing circuit 1 is synchronized with a controller of the display 18 in order to reduce interference with optical display signals. In detail, the proximity sensing circuit 1 is operated such that during the proximity measurement the display 18 itself is stable, for instance on or off, in order to avoid influence of changes of emissions of the pixels of the display 18 onto the measurement signal. In an exemplary implementation the proximity sensing circuit 1 is activated three milliseconds before the refresh of an AMOLED display 18.

In a further development the device has a post-processing component, also known as synchronous demultiplexer for proximity applications, which is used in combination with the proximity sensing circuit 1. Said post-processing component at least has an integrator circuit and an inverter circuit which can be selectively coupled to the input of the inverter circuit. Consequently, for determining the proximity of the human user 20, first the proximity sensing circuit 1 is operated as described above with the optical emitting device 10 sending the signal S1 and the measurement signal being positively integrated by the integrator circuit. The measurement signal basically reflects a sum of the reflected signal and ambient light. Next, the optical emitting device 10 is switched off, the inverter circuit at the input of the integrator is activated and integration of the measurement signal is continued, the measurement signal now mainly reflecting ambient light. By this negative integration influence of ambient light, e.g. sunlight at approximately 970 nm, is removed from the measurement signal and a measurement result is provided accordingly.

Figure 2:
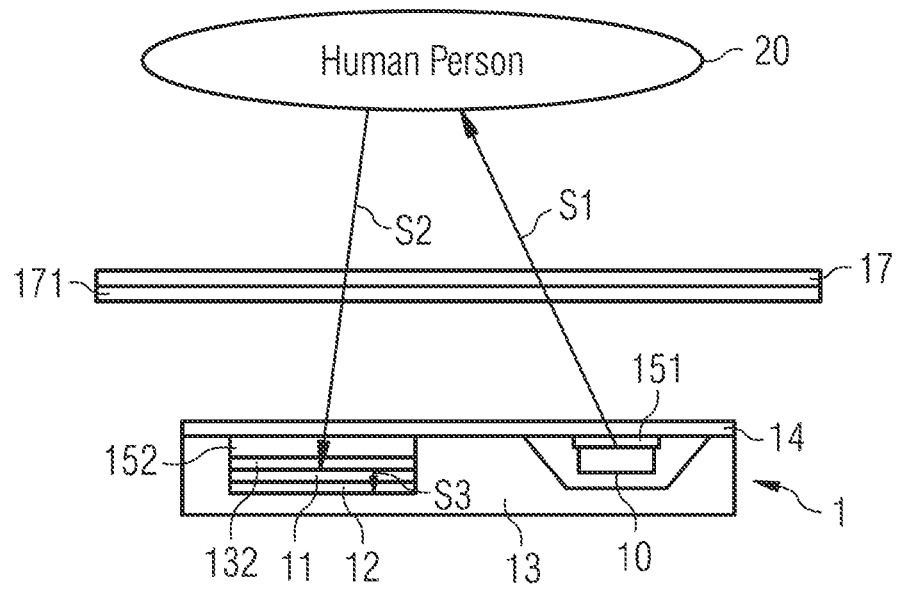
FIG. 2 shows a second embodiment example of the proposed handheld device with the proposed optical proximity sensing circuit.

FIG. 2 shows a second embodiment example of the proposed handheld device with the proposed optical proximity sensing circuit. The embodiment depicted in FIG. 2 coincides with the embodiment of FIG. 1 except for the differences described in the following. In this embodiment the device has the bezel 17 which in turn has a coating layer 171 and the optical proximity sensing circuit 1. As described above, the bezel 17 faces the human user 20. The optical proximity sensing circuit 1 is arranged beneath the coating layer 171. Therefore, in contrast to the embodiment of FIG. 1, the device in this embodiment does not have a display.

In addition to the embodiment of FIG. 1, the proximity sensing circuit 1 has a first optical lens 151, a second optical lens 152 and a second filter 132. The first optical lens 151 is mounted to the optical emitting device 10 and represents a light beam-shaping means for the signal S1. The second optical lens 152 is mounted to the conversion material 11 and represents a light beam-shaping means for the reflected signal S2. The second filter 132 is also mounted to the conversion material 11, in this special embodiment the second filter 132 is inserted between the second optical lens 152 and the light conversion material 11.

In this embodiment the signal S1, which is emitted by the optical emitting device 10, passes the first optical lens 151 by means of which it gets shaped or focussed, passes through the coating layer 171 and the bezel 17 and gets reflected off the human user 20. The resulting reflected signal S2 passes through the bezel 17, the coating layer 171 and the blocking layer 14 which is transmissive for the wavelength of the reflected signal S2. The reflected signal S2 passes through the second optical lens 152 by which it gets shaped or focussed, then passes through the second optical filter 132 which works like a band pass filter and only transmits light with a wavelength in the range of 1400 to 1500 nm and then reaches the conversion material 11. The reflected signal S2 here is up-converted to the detectable signal S3, i.e. into visible light at a wavelength of approximately 630 nm. The detectable signal S3 hits the optical receiving device 12, for instance a photodiode, which subsequently provides the measurement signal to a downstream processor. The second optical filter 132 which can be implemented as a colour or interference filter, improves the optical signal-to-noise ratio. Once again in this embodiment the conversion material 11 is in pass-through mode.

Figure 3:
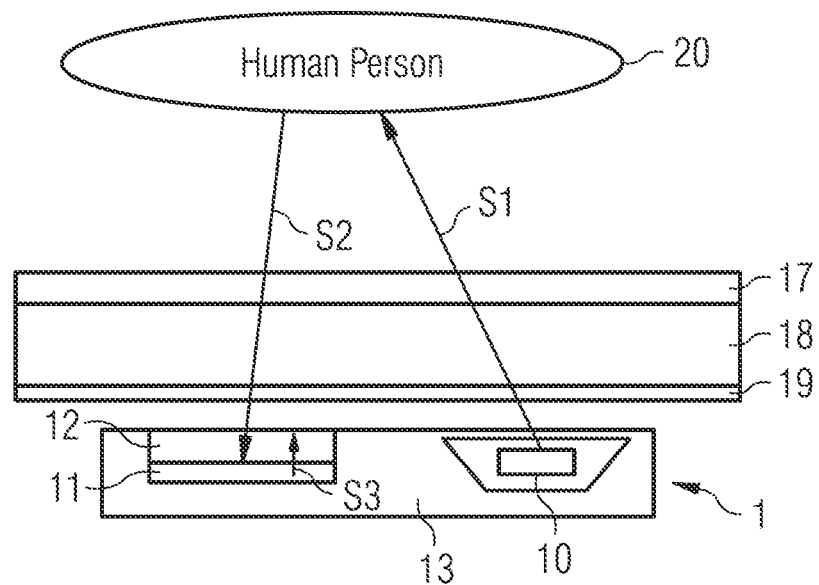
FIG. 3 shows a third embodiment example of the proposed handheld device with the proposed optical proximity sensing circuit.

FIG. 3 shows a third embodiment example of the proposed handheld device with the proposed optical proximity sensing circuit. The embodiment of FIG. 3 coincides with the embodiment of FIG. 1 except for the differences described below. In FIG. 3 the optical proximity sensing circuit 1 is implemented in a different way. The circuit 1 has the optical emitting device 10, the conversion material 11 and the optical receiving device 12. In this embodiment the optical receiving device 12 is arranged in relation to the conversion material 11 such that the reflected signal S2 passes through the optical receiving device 12 and then hits the conversion material 11. The conversion material 11 in this embodiment is reflective such that the detectable signal S3, which is produced by the conversion material 11, is heading in an upward direction as depicted in FIG. 3. In comparison to the embodiments described in FIG. 1 and FIG. 2, the optical receiving device 12 is flipped so that it faces upside-down in FIG. 3. It has been found that silicon is transparent for light at a wavelength of 1500 nm. Consequently, the reflected signal S2 just passes the photodiode of the optical receiving device 12 before it gets up-converted. Advantageously, this embodiment does not need a blocking layer 14.

The optical emitting device 10 in this embodiment comprises an LED which emits light with a wavelength of approximately 1500 nm. Alternatively to the photodiode just described, a silicon die with a backside illuminated photodiode can be used in this embodiment. The conversion material 11 up-converts the reflected signal S2 into the detectable signal S3 with a shorter wavelength of approximately 980 nm. The detectable signal S3 is sensed by the photodiode of the optical receiving device 12.

Also, in this embodiment an optical filter can be placed between the conversion material 11 and the optical receiving device 12 similar to the second filter 132 described in relation to FIG. 2.

Advantageously the light of the detectable signal S3 which would be visible to the human user 20 is blocked inside the optical proximity sensing circuit 1 due to its upward direction.

Each of the embodiments described above has an optical barrier 13 which is mounted between the optical emitting device 10 and the optical receiving device 12 which prevents crosstalk between emitting device 10 and receiving device 12. In an exemplary implementation emitting device 10, conversion material 11 and receiving device 12 are mounted in a package whose material prevents the signal S1 from directly reaching the conversion material 11 and/or the receiver 12, thereby realizing the optical barrier 13.

Figure 4:
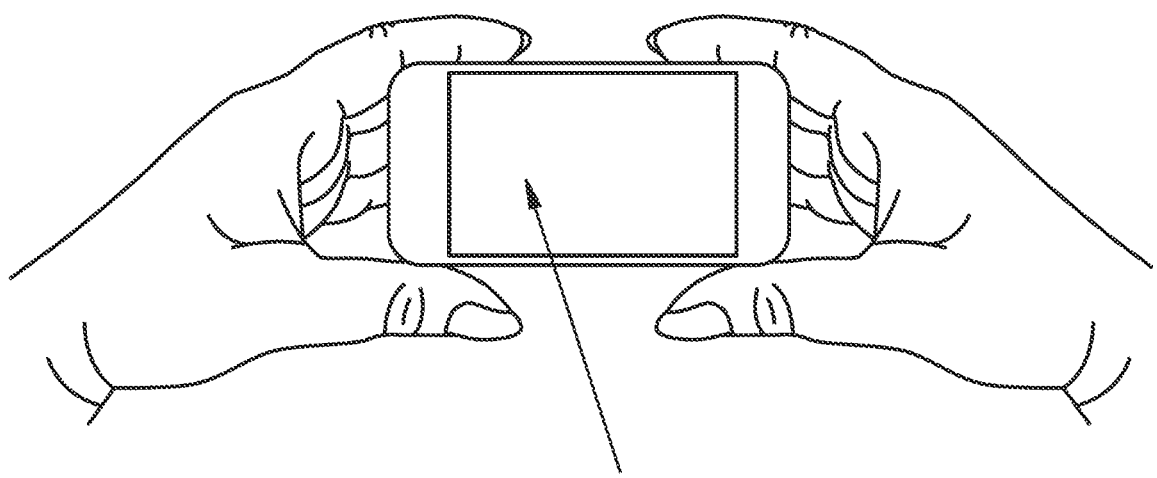
FIG. 4 shows an embodiment example of the proposed handheld.

FIG. 4 shows an embodiment example of the proposed handheld device. The device in this case is a smartphone. The arrow indicates an exemplary position of the optical proximity sensing circuit described above which is operated beneath the display of the device.

Figure 5:
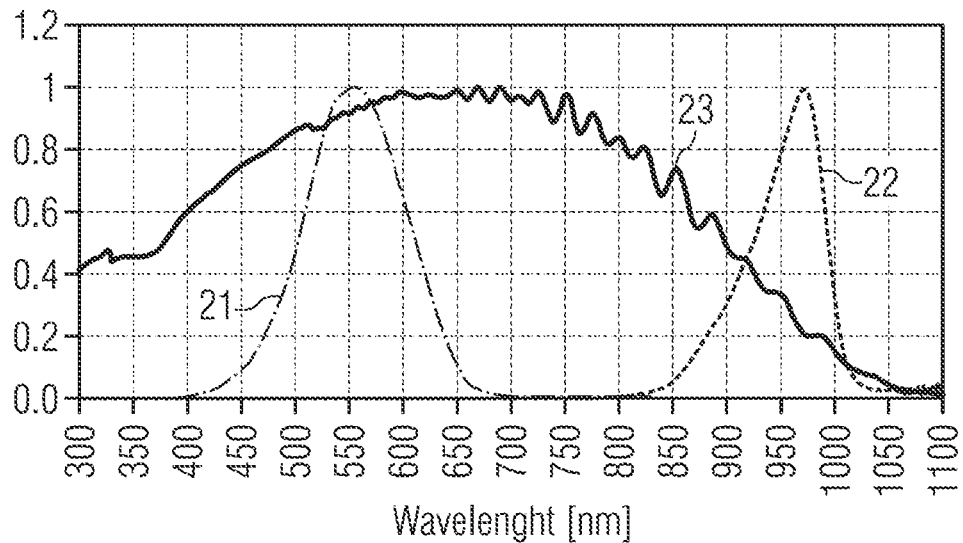
FIG. 5 shows a spectral overview.

FIG. 5 shows a spectral overview. With reference to the wavelength in nanometre a normalized sensitivity of a photodiode, the human eye and an emission of an LED are compared. The curve 21 shows the well-known human eye sensitivity which ranges roughly from 400 nm to 680 nm with a maximum at 555 nm. The curve 22 shows the emission of a state-of-the-art near infrared LED with a range of approximately 825 to 1100 nm and a maximum at 975 nm. Curve 23 depicts the sensitivity of a photodiode ranging roughly from 300 nm to 1100 nm.

It can be easily determined that the maximum emission of the LED which is used in state-of-the-art optical proximity sensors occurs at a less sensitive region of the photodiode. Therefore, the proposed optical proximity sensing circuit uses an optical emitting device with a higher wavelength and a subsequent conversion of the reflected signal.

Figure 6:
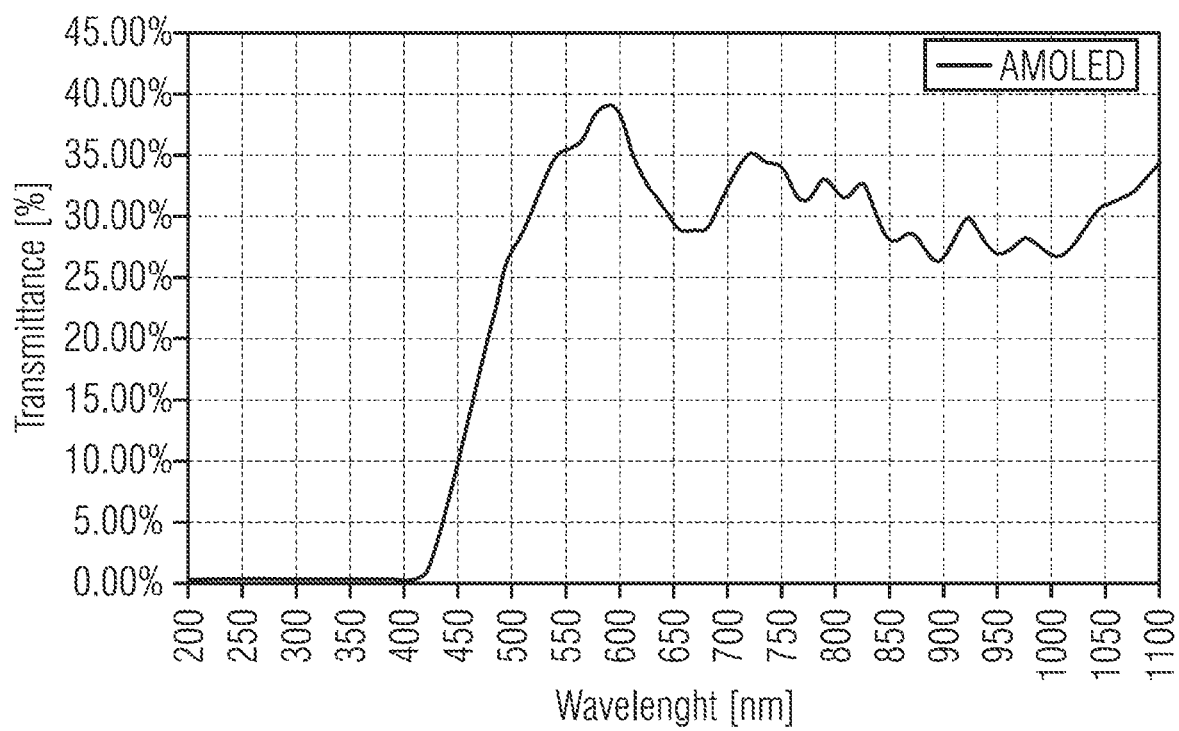
FIG. 6 shows a spectral transmission of a display.

FIG. 6 shows the spectral transmission of a display. A percentage of the transmittance of an AMOLED display is depicted in relation to the wavelength in nanometre. It can be seen that the transmittance at the wavelength used in the proposed optical proximity sensing circuit, i.e. wavelength higher than 1100 nm, is relatively high.

Figure 7:
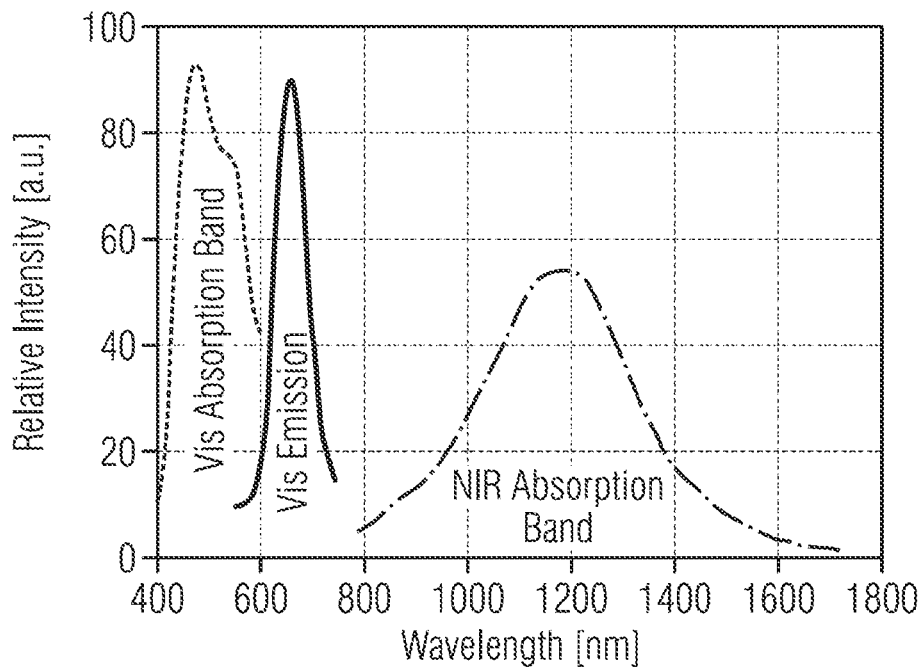
FIGS. 7 and 8 each show characteristic diagrams of a conversion material.

FIG. 7 shows characteristic diagrams of a typical conversion material which may be used in the proposed optical proximity sensing circuit. The relative intensity is depicted in relation to the wavelength in nanometer for an up-conversion material from 1200 nm to 650 nm. Therein, NIR refers to the near infrared spectrum, while vis refers to the visible spectrum.

Figure 8:
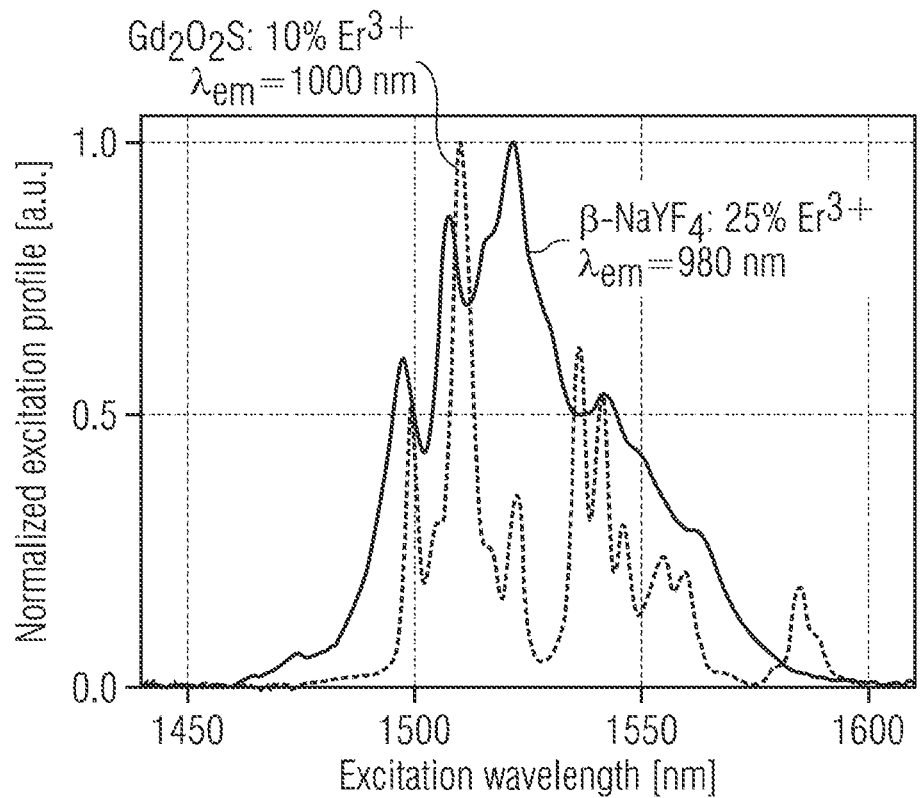

FIG. 8 shows characteristic diagrams of another conversion materials which may be used in the proposed optical proximity sensing circuit. Here, the normalized excitation profile is depicted in relation to the excitation wavelength in nanometre for two different conversion materials up-converting from 1500 nm to 980 nm.

The conversion materials described with relation to FIGS. 7 and 8 can be used to realize the proposed optical proximity sensing device. When choosing conversion material it has to be ensured that stimulated anti-stokes raman scattering materials are used which take two photons of a similar and longer wavelength to generate one photon of a shorter wavelength. Materials with higher quantum yields are desirable.

Figure 9:
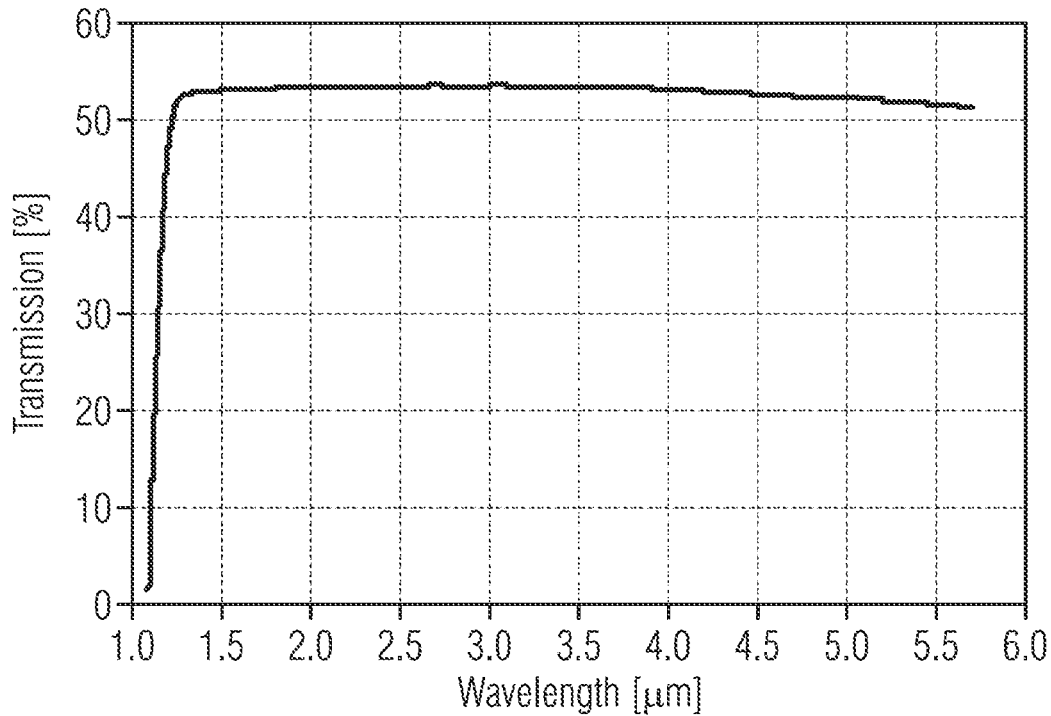
FIG. 9 shows a spectral transmission of silicon.

FIG. 9 shows a spectral transmission of silicon. A percentage of the transmission is depicted in relation to the wavelength in micrometre which is typical for a probe sample of a thickness of 10 mm. It turns out that the transmission for the wavelength used in the proposed optical proximity sensing circuit is high.

Figure 10:
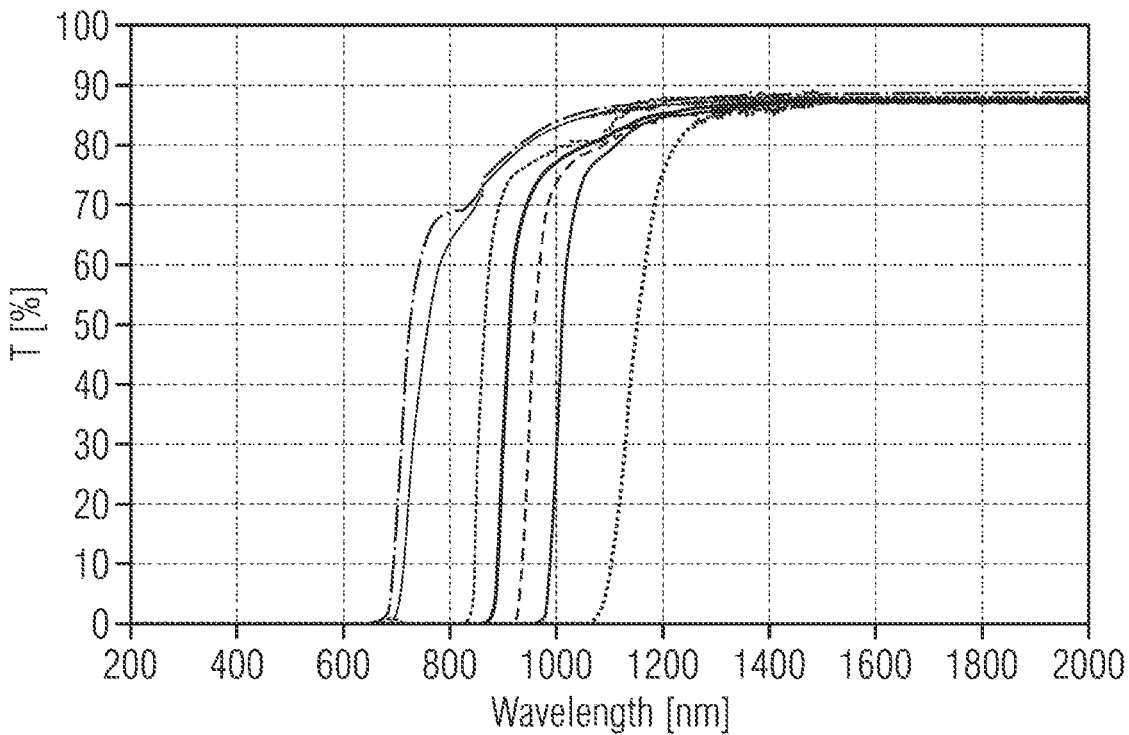
FIG. 10 shows a spectral transmission of a blocking layer.

FIG. 10 shows a spectral transmission of a blocking layer. A percentage of the transmission of black ink is shown in relation to the wavelength in nanometre. It can be seen that the different materials which are used for the black ink realizing the blocking layer is relatively high for the wavelength used for the signal S1 and the reflected signal S2, however it blocks the wavelength of the detectable signal S3, which is in the visual range.

Figure 11:
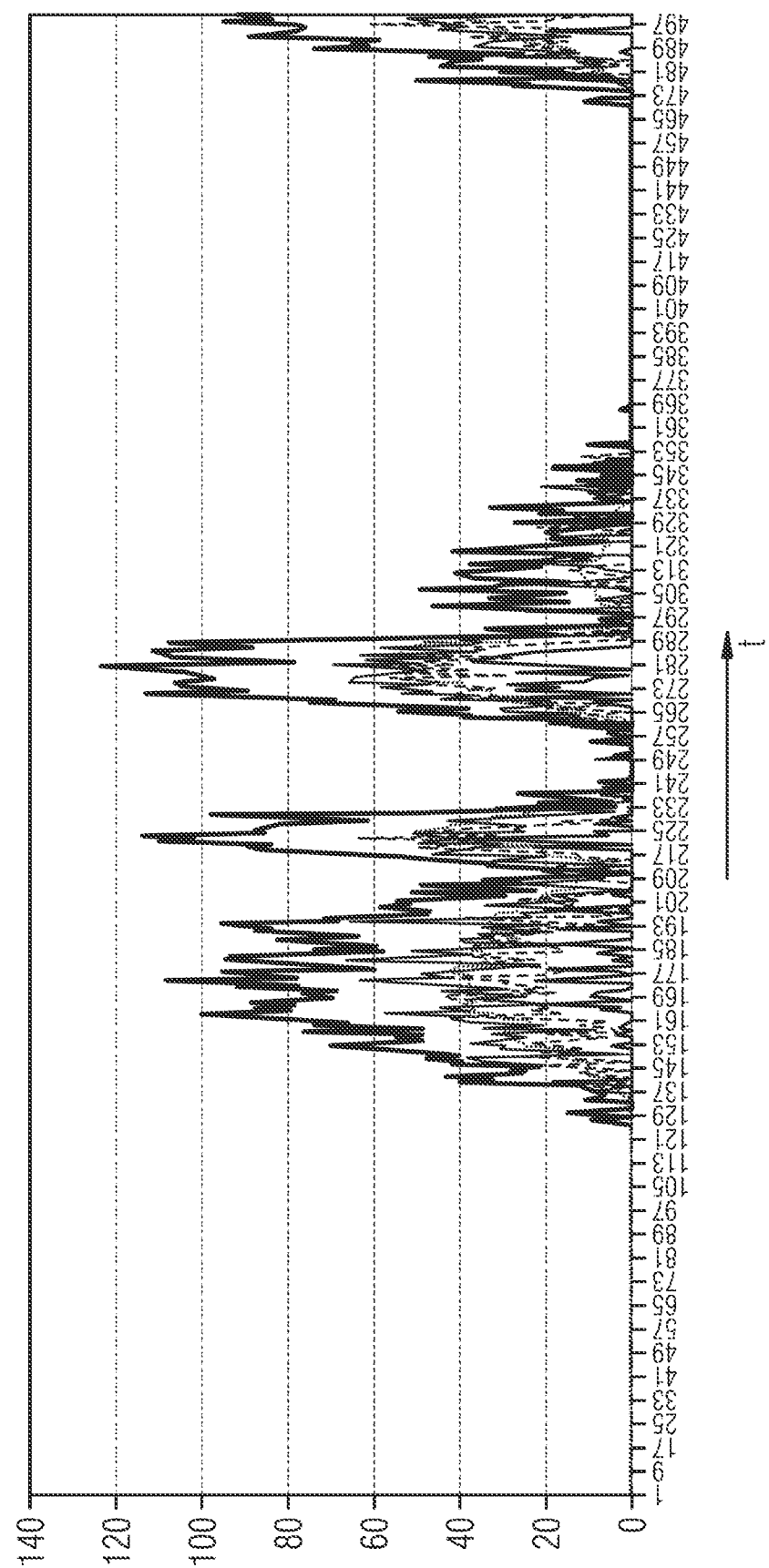
FIG. 11 shows measurement results of the proposed optical proximity sensing circuit.

FIG. 11 shows measurement results of the proposed optical proximity sensing circuit. An inversion of the distance between the optical proximity sensing circuit and the human user is shown in relation to time t. The different curves depict the different measurement results of various photodiodes employed in the optical receiving device. From top to bottom a wide band photodiode, for instance an NWell diode, a red photodiode, blue photodiode, green and clear channel photodiode are shown. The detection distance in this measurement was about 2 cm. It can be discerned that the human user approaches during a first period in which the distance between the human user and the sensing circuit is reflected in a lower or higher intensity of the signal. The user then removes himself from the sensing circuit and subsequently re-approaches the sensing circuit.

It can be seen that the wide band photodiode catches most of the detectable signal.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the proposed optical proximity sensing circuit and corresponding method which are defined in the accompanying claims.

The invention claimed is:

1. An optical proximity sensing circuit comprising
   an optical emitting device which is prepared to send a signal having a wavelength of the invisible spectrum,
   a light conversion material being prepared to convert a reflected signal into a detectable signal, the reflected signal being a function of a reflection of the signal off a human user and the detectable signal having a wavelength of the visible spectrum, and
   an optical receiving device arranged apart from but in a visual range of the optical emitting device and prepared to detect the detectable signal and therefrom provide a measurement signal which is a function of a distance between the optical proximity sensing circuit and the human user,
   wherein the conversion material is mounted to the optical receiving device,
   wherein each of the signal, the reflected signal and the detectable signal is an optical signal,
   wherein the light conversion material is semi transparent,
   wherein the optical receiving device is arranged in relation to the light conversion material such that the reflected signal passes through the light conversion material to hit the optical receiving device, wherein the optical proximity sensing circuit further comprises a blocking layer which covers a surface of the optical receiving device and a surface of the optical emitting device, the blocking layer being prepared to prevent the detectable signal from leaving the optical proximity sensing circuit, and wherein the optical proximity sensing circuit is prepared for optical proximity sensing in a handheld device without an opening or aperture.

2. The optical proximity sensing circuit according to claim 1, wherein the light conversion material comprises a stimulated anti-stokes raman scattering material.

3. The optical proximity sensing circuit according to claim 1, wherein the optical emitting device comprises at least one light-emitting diode which is prepared to emit light with a wavelength of approximately 1200 nm as the signal, or wherein the optical emitting device comprises a vertical-cavity surface-emitting laser which is prepared to emit light with a wavelength of approximately 1500 nm as the signal.

4. The optical proximity sensing circuit according to claim 1, wherein the optical receiving device comprises at least one photo-diode which is sensitive for light in the range of 300 nm to 1100 nm.

5. The optical proximity sensing circuit according to claim 4, wherein the photo-diode is realized as a silicon photo-diode which is doped with an up-conversion material, the up-conversion material representing the conversion material.

6. The optical proximity sensing circuit according to claim 1, further comprising an optical barrier which is mounted between the optical emitting device and the optical receiving device.

7. The optical proximity sensing circuit according to claim 1, further comprising a first filter mounted between the conversion material and the optical receiving device, the first filter being prepared to transmit light with a wavelength of about 950 nm, and/or a second filter mounted to the conversion material such that the reflected signal passes the second filter before reaching the conversion material, the second filter being prepared to transmit light with a wavelength in the range of 1400 nm to 1500 nm.

8. The optical proximity sensing circuit according to claim 1, further comprising a first optical lens which is mounted to the optical emitting device, the first optical lens representing a light-beam shaping means for the signal, and/or a second optical lens which is mounted to the conversion material, the second optical lens representing a light-beam shaping means for the reflected signal.

9. The optical proximity sensing circuit according to claim 1, wherein the light conversion material is reflective, and wherein the optical receiving device is arranged in relation to the light conversion material such that the reflected signal passes through the optical receiving device to hit the light conversion material.

10. A handheld device having a bezel which is prepared to form an outer surface of the device, wherein the bezel faces a human user, and the optical proximity sensing circuit according to claim 1, wherein the bezel has a coating layer which is transparent to the signal, and wherein the optical proximity sensing circuit is arranged beneath the coating layer of the bezel.

11. The handheld device according to claim 10, further comprising a display mounted between the bezel and the optical proximity sensing circuit, wherein the display comprises a liquid-crystal display or an active matrix organic light-emitting diode display, and wherein the display has a backside which is transparent to the signal and the optical proximity sensing circuit is arranged beneath the backside of the display, wherein the coating layer of the bezel comprises an opening for receiving the display.

12. The handheld device according to claim 10, further comprising a post-processing component having an integrator circuit and an inverter circuit which can be selectively coupled to an input of the inverter circuit, the post-processing component being prepared to receive the measurement signal and to provide a measurement result as a function of an integration of the measurement signal.

13. A method for optical proximity sensing using the optical proximity circuit according to claim 1, the method having the following steps generating and sending, by the optical emitting device, a signal having a wavelength of the invisible spectrum, receiving, by the light conversion material, a reflected signal which is a function of a reflection of the signal off a human user, converting, by the light conversion material, the reflected signal and therefrom providing a detectable signal having a wavelength of the visible spectrum, and receiving, by the optical receiving device, the detectable signal and therefrom providing a measurement signal which is a function of a distance between an optical proximity sensing circuit and a human user, wherein each of the signal, the reflected signal and the detectable signal is an optical signal.

14. The method for optical proximity sensing according to claim 13, wherein converting the reflected signal is realized by up-converting a wavelength of the reflected signal from a wavelength of the invisible spectrum into a wavelength of the visible spectrum as the wavelength of the detectable signal.

15. The method for optical proximity sensing according to claim 13, further comprising shaping the signal and/or the reflected signal, and/or, filtering the reflected signal.

* * * * *